United States Patent [19]

MacDonald

[11] Patent Number: 5,452,434
[45] Date of Patent: Sep. 19, 1995

[54] CLOCK CONTROL FOR POWER SAVINGS IN HIGH PERFORMANCE CENTRAL PROCESSING UNITS

[75] Inventor: James R. MacDonald, Austin, Tex.

[73] Assignee: Advanced Micro Devices, Inc., Sunnyvale, Calif.

[21] Appl. No.: 913,289

[22] Filed: Jul. 14, 1992

[51] Int. Cl.⁶ .................................................. G06F 1/04
[52] U.S. Cl. ..................................... 395/550; 395/750; 395/800
[58] Field of Search ................. 395/375, 550, 750, 800

[56] References Cited

U.S. PATENT DOCUMENTS

| | | | |
|---|---|---|---|
| 4,694,393 | 9/1987 | Hirano et al. | |
| 4,758,559 | 5/1988 | Smith et al. | |
| 4,758,945 | 7/1988 | Remedi | |
| 4,907,150 | 3/1990 | Arroyo et al. | 364/200 |
| 4,980,836 | 12/1990 | Carter et al. | 364/483 |
| 5,025,387 | 6/1991 | Frane | 364/493 |
| 5,083,266 | 1/1992 | Watanabe | |
| 5,086,387 | 2/1992 | Arroyo et al. | 395/550 |
| 5,167,024 | 11/1992 | Smith et al. | 395/375 |
| 5,175,853 | 12/1992 | Kardach et al. | 395/650 |
| 5,203,003 | 4/1993 | Donner | 395/750 |
| 5,247,655 | 9/1993 | Khan et al. | 395/750 |
| 5,276,824 | 1/1994 | Skruhak et al. | 395/375 |
| 5,388,265 | 2/1995 | Volk | 395/750 |
| 5,392,437 | 2/1995 | Matter et al. | 395/750 |

FOREIGN PATENT DOCUMENTS

| | | | |
|---|---|---|---|
| 0229692 | 7/1987 | European Pat. Off. | |
| 0364222 | 4/1990 | European Pat. Off. | |
| 0421431 | 4/1991 | European Pat. Off. | |
| 421431 | 4/1991 | European Pat. Off. | G06F 1/32 |

*Primary Examiner*—Kevin A. Kriess
*Assistant Examiner*—Dennis M. Butler
*Attorney, Agent, or Firm*—Foley & Lardner

[57] ABSTRACT

The invention relates to a clock controller circuit for performing a power saving feature in high performance microprocessors. The invention utilizes two logic gates and a flip flop for disabling a clock signal to an execution unit or ALU when data is not available for the execution unit or ALU. The invention provides a sleep mode or clock idle mode for an execution unit when data is not available for the execution unit because memory units, I/O devices, or internal caches are unable to provide data or instructions to the execution unit. The clock controller circuit disables the clock signals by gating the clock signal to a logic high. The clock controller circuit stops the clock signals in response to a no data available signal from a bus unit and a data required signal from the execution unit.

24 Claims, 4 Drawing Sheets

CLOCK CONTROL FOR POWER SAVINGS IN HIGH PERFORMANCE CENTRAL PROCESSING UNITS

This invention relates generally to microcomputers or microprocessors and, more particularly, to an apparatus for reducing power consumed by a central processing unit.

In many or most applications, it is highly desirable for computer systems or microprocessors to consume a minimum amount of power. Such applications include laptop computers and computer notebooks, for example, which are often powered by a battery. Computer systems and microprocessors generally include a processing or execution unit which represents a significant portion of the power consumption of such systems and microprocessors. As a result, the power consumption of computer systems and microprocessors may be reduced significantly if the power consumption of the execution unit is reduced to a minimum.

General techniques for reducing the amount of power used by microprocessors include disabling the clock signal to the microprocessor when the microprocessor is not needed. Examples are U.S. Pat. No. 4,758,945 issued to Remedi on Jul. 19, 1988 and U.S. Pat. No. 4,758,559 issued to Smith et al. on May 31, 1988. Both patents describe a method and apparatus for reducing power consumed by a static microprocessor. As described in those patents, clock signals to the entire microprocessor are disabled in response to a halt instruction and oscillator signals to the entire microprocessor are disabled in response to a stop instruction to reduce power consumption. The above method and apparatus is disadvantageous because subsystems in the microprocessor cannot be utilized when clock signals are disabled to the entire microprocessor.

In accordance with another prior art technique for reducing power consumed by a coprocessor, the coprocessor utilizes a sleep mode which disables clock signals when the coprocessor is not performing an instruction. In the Am80EC287 manufactured by Advanced Micro Devices of Sunny Vale, California, for example, an interface device within the coprocessor enables clock signals when an instruction is received from a host or main processor. After the execution unit within the coprocessor completes the instruction, the execution unit disables the clock signals. The clock signals are not re-enabled until the interface device receives another instruction from the host processor.

Generally, microprocessor units include an execution unit for performing various functions on data, and an I/O control circuit for fetching or providing data or instructions to and from the execution unit and a memory. The memory can be internal or external. Generally, the execution unit and I/O control circuit are operated in response to a clock signal.

The execution units of more advanced microprocessors can perform operations on data in response to instructions more quickly than the I/O control circuit can provide the data and instructions to the execution units from memory or write data from the execution units to memory. Memory units, as a result, read and write data comparatively slowly. Thus, execution units often need to wait for data or instructions from the I/O control circuit.

Prior art microprocessors generally continue to provide clock signals to the execution unit when the execution unit does not have any data on which to perform operations or does not have any instructions. Constantly clocking an execution unit when it cannot perform an operation unnecessarily consumes power. Thus, power is wasted when a clock signal is supplied to an execution unit during those times when data or instructions are not available to the execution unit.

Thus, there is a need for an apparatus which would inhibit or idle clock signals to the execution unit when the execution unit is unable to perform operations because data or instructions are not accessible to the execution unit.

SUMMARY OF THE INVENTION

The present invention therefore provides a central processing unit including an execution means which performs operations on data provided on a data bus in response to a clock signal and generates a data needed signal. The central processing unit further includes bus interface means for providing the data on the data bus and generating a no data available signal. The central processing unit also includes a clock disable means for disabling the clock signal in response to the no data available signal and the data needed signal.

The clock disable means may include a first logic gate having an output and inputs coupled to the bus interface means and the execution means, a flip flop having a data input coupled to the first logic gate output and a clock input coupled to the clock signal, and a second logic gate which includes a first input coupled to the flip flop output, a second input coupled to the clock signal, and an output coupled to the execution means.

The present invention further provides a computer system including an interface unit, an execution unit and a clock inhibit circuit. The interface unit communicates data from a data source to the execution unit via a data bus. The execution unit performs functions on the data in response to a clock signal. The clock inhibit circuit stops the clock signal supply to the execution unit when the execution unit does not have any data on which to perform functions.

The invention further provides a method for operating a processor of the type including a bus unit and an execution unit. The method includes the steps of providing data from the bus unit to the execution unit and performing operations on the data in the execution unit in response to a clock signal. The method further includes the steps of transmitting a no data available signal from the bus unit to a clock controller circuit when the bus unit cannot provide data to the execution unit and transmitting a data required signal from the execution unit to the clock controller circuit when the execution unit is out of data. The method further includes the steps of causing the clock controller circuit to idle the clock signal in response to the no data available signal and the data required signal so that the clock signal is not received by the execution unit.

The method may further include the step of engaging the clock signal in the clock controller circuit when the bus unit transmits a data available signal.

The invention still further provides a circuit including a first logic gate, a register, and a second logic gate. The first logic gate is coupled to receive a first control signal and a second control signal. The register includes a first input coupled to an output of the first logic gate. The flip flop includes a clock input coupled to a clock signal. A second logic gate is coupled to receive the clock signal and a register output.

BRIEF DESCRIPTION OF THE DRAWINGS

The preferred exemplary embodiments of the present invention will hereinafter be described in conjunction with the appended drawings, wherein like designations denote like elements, and.

DETAILED DESCRIPTION

Figure 1:
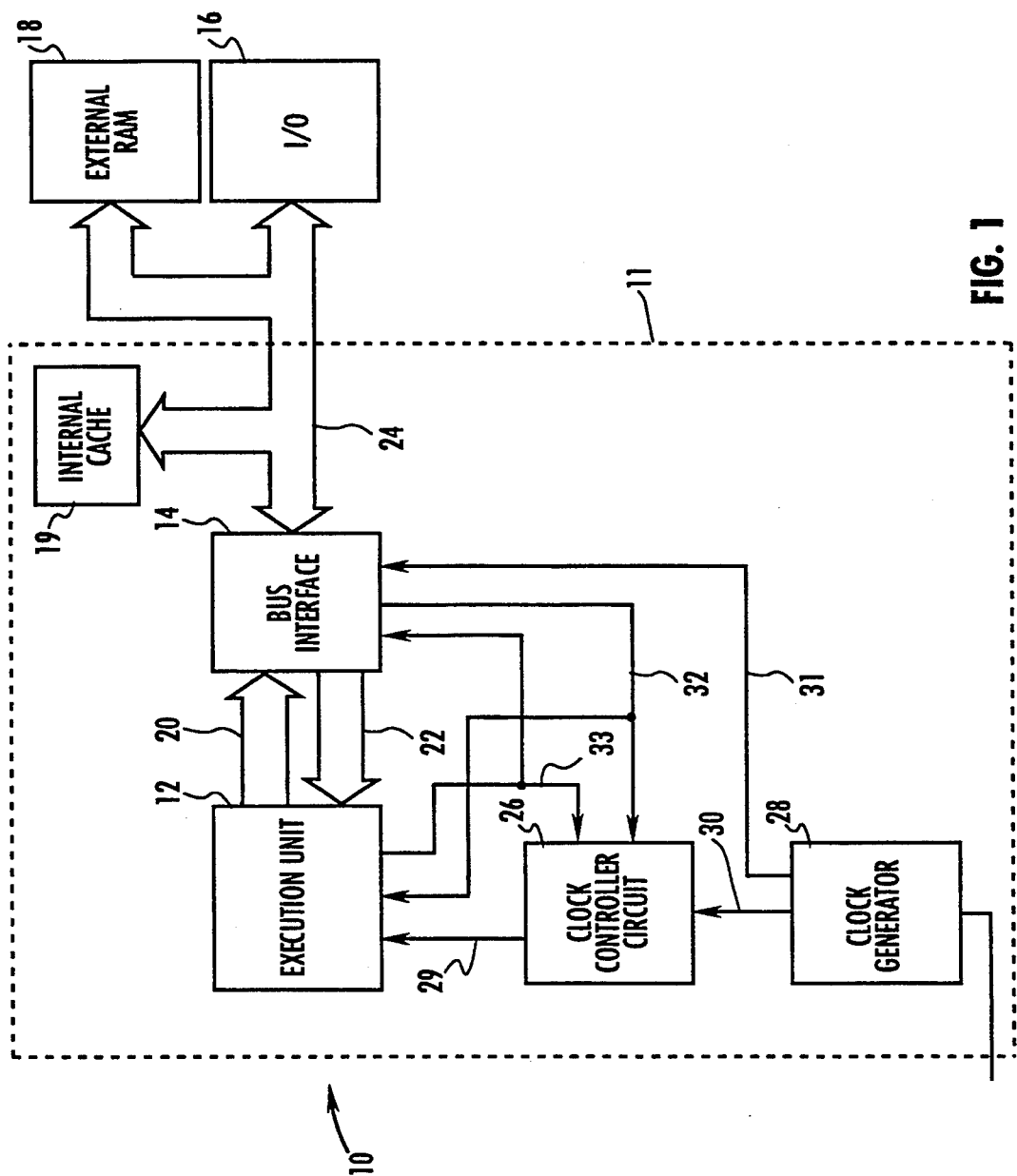
FIG. 1 is a block diagram of a computer system embodying the present invention in accordance with a first preferred exemplary embodiment.

FIG. 1 illustrates, in block diagram form, a computer system 10 embodying the present invention in accordance with a first preferred exemplary embodiment. The computer system 10 generally includes a fully integrated central processing unit 11, an external input/output (I/O) device 16, and an external random access memory unit (RAM) 18.

The central processing unit 11 generally includes an execution unit 12, a bus interface device 14, an internal cache 19, a clock controller circuit 26 and a clock generator 28. The execution unit 12 is coupled to the bus interface device 14 by a write bus 20 and a read bus 22. The bus interface device 14 is also coupled to the memory unit 18 by an address/data bus 24. The address/data bus 24 also couples the internal cache 19 and the I/O device 16 to the bus interface device 14.

The clock generator 28 is coupled to receive a clock signal at an input 27 from an external source (not shown). The clock generator 28 is coupled to the bus interface device 14 and the clock controller circuit 26 by a conductor 31 and a conductor 30, respectively. The clock controller circuit 26 is in turn coupled to the execution unit 12 by a conductor 29 and a conductor 33. The bus interface device 14 is also coupled to clock controller circuit 26 by conductor 32.

As will be seen hereinafter, clock controller circuit 26 is a clock idle circuit or a clock disable circuit for providing and inhibiting clock signals to the execution unit 12. A preferred form of clock controller circuit will be described subsequently with reference to FIG. 3.

In a manner well known in the art, execution unit 12 may include arithmetic logic units (ALUs) or other circuits for providing arithmetic or logic functions on data. Data which can be instructions, addresses, or operand data is provided by the bus interface unit 14 over read bus 22 to the execution unit 12. After the execution unit 12 has completed arithmetic or logic functions, the execution unit 12 provides result data to the bus interface device 14 over the write bus 20. The write bus 20 and the read bus 22 are illustrated as being separate unidirectional busses but, as is also well known in the art, may be combined as a single bi-directional read-/write bus.

The bus interface device 14 communicates data between the execution unit 12 and the I/O device 16, the memory unit 18, or the internal cache 19. The bus interface device 14 receives and transmits data to the memory unit 18, the I/O device 16, and the internal cache 19 over the address/data bus 24. Hence, the bus interface device 14 is responsible for fetching data and instructions for execution unit 12. Alternatively, the address/data bus 24 could be implemented as separate address and data buses or separate instruction and data buses without departing from the present invention. Further, the address/data bus 14 could further be subdivided into separate read and write buses.

The execution unit 12 responds to instructions provided on the read bus 22 and performs operations on the data supplied on the read bus 22 pursuant to those instructions. The execution unit 12 performs the operations in response to or upon receipt of clock signals provided to it on conductor 29 from the clock controller circuit 26.

The bus interface device 14 provides data over read bus 22. If the bus interface device 14 is unable to provide data over the read bus 22, the bus interface device 14 provides a QUEUE EMPTY signal to the clock control circuit 26 over conductor 32. The QUEUE EMPTY signal is a no data available signal representing that the bus interface device 14 does not have any data, such as operand data or instructions, to provide to the execution unit 12. In accordance with the present invention, when the execution unit 12 is out of data such as operand data or instructions, the execution unit 12 produces a DATA REQUIRED signal which is conveyed to both the bus interface device 14 and the clock control circuit 26 over conductor 33. The DATA REQUIRED signal is a need data signal or a request data signal representing that the execution unit 12 needs data in order to continue executing.

In response to the QUEUE EMPTY signal and DATA REQUIRED signal, the clock controller circuit 26 inhibits the clock signals to the execution unit 12. This results in the conservation of power because clocking the execution unit 12 consumes power. Since the execution unit 12 does not have required data, either operand data or instructions, clocking the execution unit 12 at this time would represent a needless waste of power. When the bus interface 14 is able to provide data or instructions again, the bus interface device 14 removes the QUEUE EMPTY signal at conductor 33. The clock controller 26 provides clock signals to the execution unit 12 in response to the changed QUEUE EMPTY signal. The execution unit 12 then receives data or instructions and removes the DATA REQUIRED signal.

Figure 2:
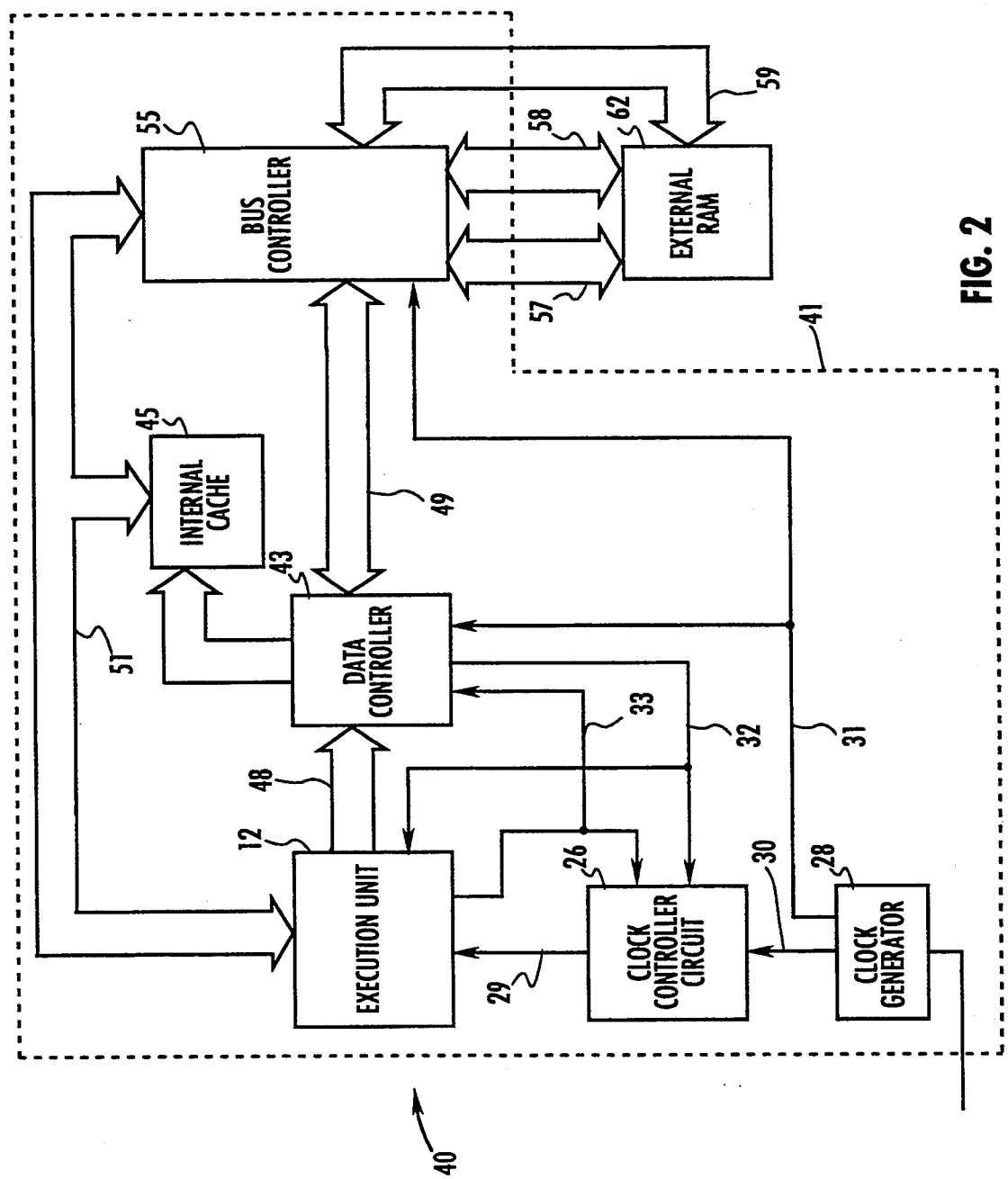
FIG. 2 is a block diagram of another computer system embodying the present invention in accordance with a second preferred exemplary embodiment.

FIG. 2 illustrates, in a block diagram form, a computer system 40 embodying the present invention in accordance with a second preferred exemplary embodiment. The computer system 40 generally includes a fully integrated central processing unit 41 and a memory 62.

The central processing unit 41 generally includes an execution unit 12, a data controller 43, a bus controller 55, an internal cache 45, a clock controller 26, and a clock generator 28. The execution unit 12 is coupled to the data controller 43 by an address bus 48 and is coupled to an internal cache 45 and a bus controller 55 by an operand data bus 51. Data controller 43 is further coupled to the internal cache 45 by an address bus 47 and is coupled to the bus controller 55 by an address bus 49. The bus controller 55 is coupled to the memory 62 by an address bus 57, a data bus 58 and a bus controller signal bus 59. The data controller 43 is coupled to the execution unit 12 by the conductor 33, to the clock controller 26 by the conductor 32, and to the clock generator 28 by the conductor 31. The conductors 31 and 32 are also coupled to the bus controller 55. The execution unit 12 is coupled to the clock controller circuit 26 by the conductor 29 and by the conductor 33. The execution unit 12 is also coupled to the data controller 43 by the conductor 32.

The clock generator 28 is similar to the clock generator 28 discussed with reference to FIG. 1. The clock generator 28 provides clock signals on conductors 30 and 31. The clock signals on the conductor 31 are provided to the data controller 43 and the bus controller 55. As will be seen hereinafter, the clock controller circuit 26 is a clock disable or clock idle circuit for providing and inhibiting clock signals to the execution unit 12.

In a manner well known in the art, the execution unit 12 may be an integer unit or floating point unit which may include ALUs or other circuits for providing arithmetic or logic functions on data such as Boolean logic functions, multiplying functions, or addition functions. Data is generally provided on operand data bus 51 by the data controller 43 and the bus controller 55. After the execution unit 12 has completed arithmetic or logic functions, the execution unit 12 provides the result data to the operand data bus 51. The data controller 43 and the bus controller 55 communicate this data to the internal cache 45, or the memory 62. The memory 62 is preferably an external memory such as a RAM or other input/output device.

The data controller 43 provides addresses from the bus controller 55 and the execution unit 12 to the internal cache 45 by the address bus 47 and receives addresses on the address bus 48 from the execution unit 12. The bus controller 55 communicates addresses to and from data controller 43 on the address bus 49. Thus, the data controller 43 and the bus controller 55 are responsible for fetching data for the execution unit 12.

The operand data bus 51 is preferably a bidirectional data bus or general bus for communicating data between the internal cache 45, the bus controller 55, and the execution unit 12. The address buses 48 and 47 are preferably single directional address buses. The address bus 49 is preferably a bidirectional address bus for communicating addresses between the data controller 43 and the bus controller 55. The data controller 43 and the bus controller 55 operate to communicate or fetch data between the memory 62 and the internal cache 45 to and from the execution unit 12. Alternatively, the data controller 43 and the bus controller 55 may be combined as a single bus input/output (I/O) device. The buses 57, 58, and 59 are preferably bidirectional buses for communicating signals between the memory 62 and the bus controller 55.

The execution unit 12 responds to instructions on an instruction bus (not shown) when performing functions on data supplied on operand data bus 51. The instructions may be fetched by additional data controllers or bus controllers. The execution unit 12 performs the operation in response to clock signals provided on the conductor 29.

The data controller 43 or the bus controller 55 operates to provide data on the operand data bus 51. If the data controller 43 and the bus controller 55 are unable to provide data on the operand data bus 51, the data controller 43 or the bus controller 55 provide a QUEUE EMPTY signal at conductor 32. When execution unit 12 is out of data or instructions, execution unit 12 produces a DATA REQUIRED signal at conductor 33. The data required signal is a need data signal or a data requested signal representing that execution unit 12 needs data or instructions in order to perform an operation.

In response to the QUEUE EMPTY signal and the data required signal, clock controller circuit 26 inhibits the clock signal at conductor 29. The clock controller circuit 26 operates similar to the clock controller circuit 26 discussed with reference to FIG. 1. Thus, power is saved as clock controller circuit 26 idles the clock at conductor 29 so that execution unit 12 is not run unnecessarily.

Figure 3:
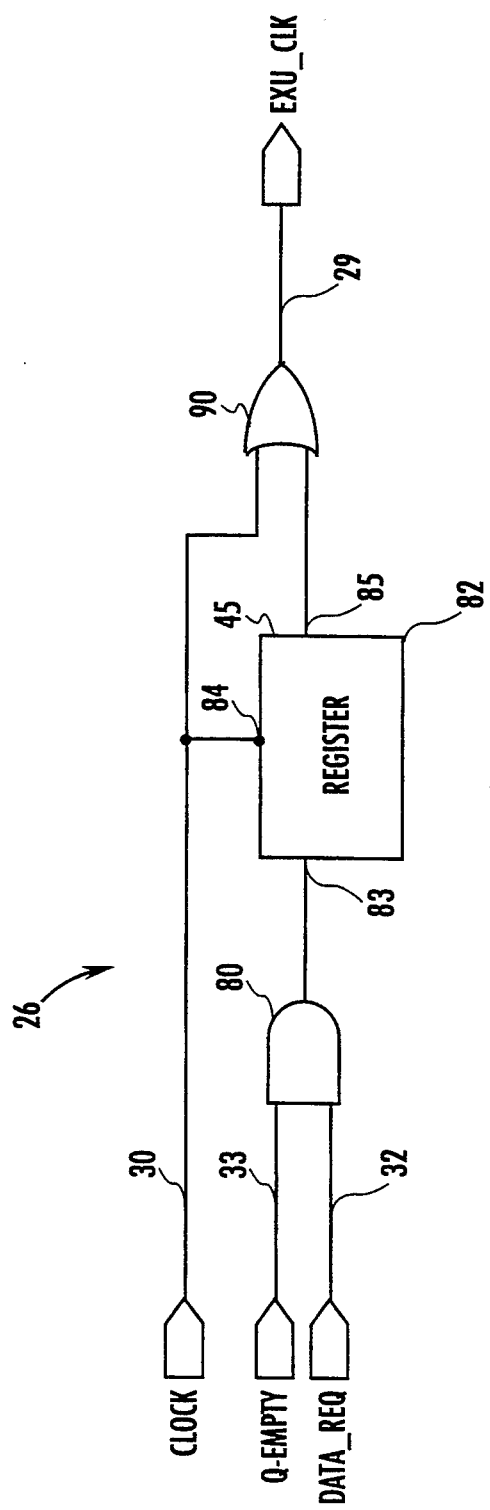
FIG. 3 is a schematic diagram of a clock controller circuit embodying further aspects of the present invention and which may be utilized to advantages in the preferred exemplary embodiments of FIGS. 1 and 2.

FIG. 3 illustrates in block diagram form a clock controller circuit 26 embodying the present invention in accordance with an example of the preferred exemplary embodiments. The clock controller circuit 26 operates similarly to clock controller circuit 26 in FIG. 1. The clock controller circuit 26 includes an AND gate 80, a register 82, and an OR gate 90. The conductor 30 is coupled to a clock input 84 of register 82 and a first input 91 on the OR gate 90. A second input 92 of OR gate 90 is coupled to an output 85 of the register 82. OR gate 90 provides an output 29 for eventual coupling to the execution unit 12 (not shown in FIG. 3). The register 82 receives output 81 of the AND gate 80 at an input 83. The AND gate 80 is also coupled to receive the conductor 33 at a first input 86 and the conductor 32 at a second input 87.

As will generally be seen hereinafter, the clock controller circuit 26 provides and inhibits clock signals at the conductor 29. Preferably, the clock signal at the conductor 29 is controlled by the output 85 of register 82.

The clock signal provided on the conductor 30 clocks the register 82. Register 82 is preferably a flip flop such as a D flip flop with a clock input such as clock input 84. When the QUEUE EMPTY signal at the conductor 33 and the DATA REQUIRED signal at the conductor 32 become logic HIGH, the AND gate 80 provides a logic HIGH to the input 83 on register 82. Preferably, the input 83 is a D input. The register 82 provides a logic HIGH at the output 85 in response to the rising edge of the next pulse of the clock signal at the clock input 84. When the second input 92 of the OR gate 90 is HIGH, the output at conductor 29 is HIGH, regardless of the signal at the first input 91 of the OR gate 90. Thus, the clock signal at the conductor 29 is gated off by OR gate 90 when the output 85 is HIGH.

When the QUEUE EMPTY signal at the conductor 33 and the DATA REQUIRED signal at the conductor 32 changes from a logic HIGH to a logic LOW, the output 81 of AND gate 80 is a logic LOW. Thus, at the next rising edge of the clock signal at the conductor 30, the register 82 outputs a logic LOW at the output 85. The OR gate 90 provides a clock signal at the conductor 29 in response to the logic LOW at the output 85.

When either the QUEUE EMPTY signal at the conductor 33 or the DATA REQUIRED signal at the conductor 32 are logic LOW, the output 81 of AND gate 80 provides a logic LOW at the input 83 of the register 82. The register 82 provides a logic LOW at the output 85 in response to clock signals at the clock input 84. The OR gate 90 provides clock signals at the conductor 29 when the second input 92 of OR gate 90 is a logic LOW.

Figure 4:
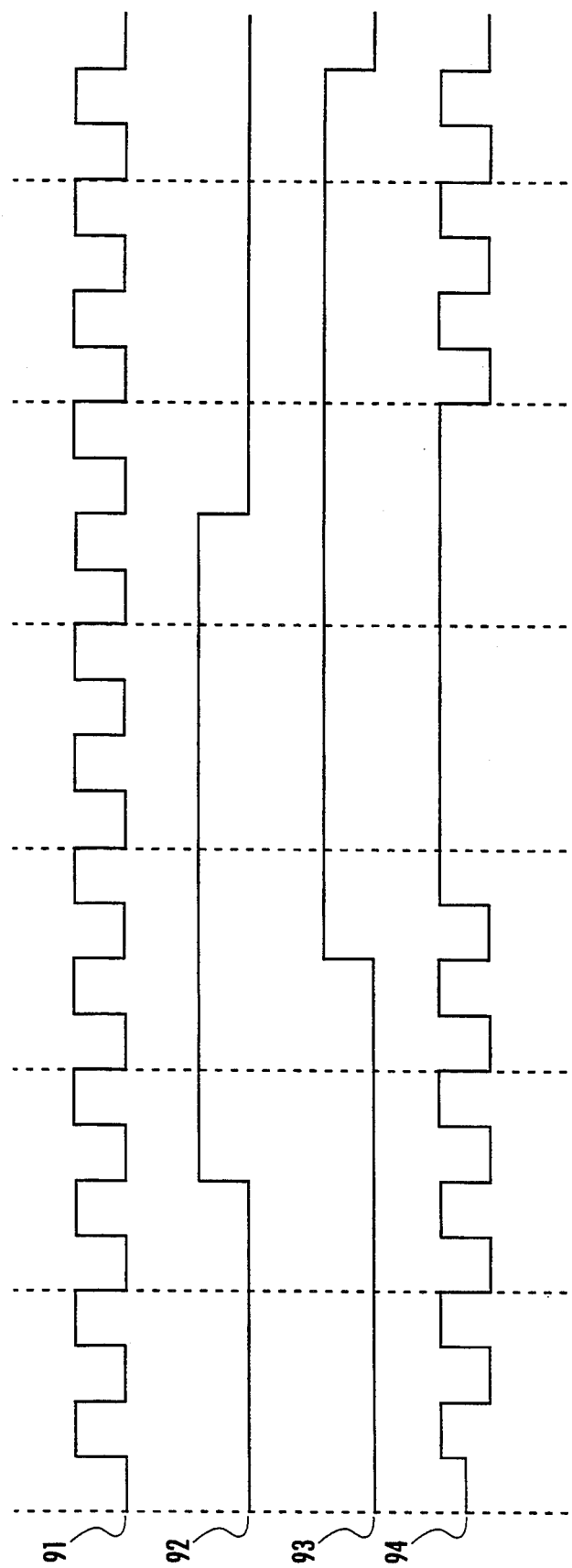
FIG. 4 is a series of timing wave forms illustrating particular aspects of the operations of the preferred exemplary embodiments of the present invention.

FIG. 4 illustrates a series of timing waveforms showing particular aspects of the operation of the preferred exemplary embodiments of the present invention. A signal 91 is representative of the clock signal provided by clock generator 28 at conductor 30. A signal 92 is representative of the QUEUE EMPTY signal provided by the bus interface device 14 at conductor 32. A signal 93 is representative of the DATA REQUIRED signal at conductor 33 provided by execution unit 12. A signal 94 is representative of the clock signal to execution unit 12 at conductor 29 provided by clock controller circuit 26.

When signals 92 and 93 are LOW, the clock signal 91 is similar to the execution unit clock signal 94. When the bus interface device 14 is unable to provide data on read bus 22, the signal 92 becomes a logic HIGH. The data may be operand data or instructions. As the execution unit 12 continues to process data in response to the execution unit clock signals 94 on the conductor 29, the execution unit 12 runs out of data and produces a logic HIGH signal 93. When both signals 92 and 93 are logic HIGH, the signal 94 becomes a logic HIGH on the rising edge of the clock signal 91.

The execution unit clock signal 94 remains a logic HIGH until the QUEUE EMPTY signal 92 becomes a logic LOW. On the rising edge of the clock signal 91 following the change of the signal 92 from a logic HIGH to a logic LOW, the execution unit clock signal 94 becomes a clock signal similar to the clock signal 91. The QUEUE EMPTY signal 92 becomes a logic LOW when data is available for the execution unit 12. In response to the execution unit clock signal 94, the execution unit 12 performs operations on the data. As data is received by execution unit 12, DATA REQUIRED signal 92 becomes a logic LOW.

It will be understood that while various conductors/connectors are depicted in the drawings as single lines, they are not shown in a limiting sense and may comprise plural conductors/connectors as is understood in the art. Further, the above descriptions are of preferred exemplary embodiments of the present invention and are not limited to the specific forms shown. For example, while two central processing unit architectures were shown, the invention could be used in any central processing unit architecture. Likewise, the logic gates and flip flops employed in the clock controller circuit could be arranged in various ways, and the clock controller circuit could utilize various other logic circuits without departing from the spirit of the invention as recited in the claims. Also, other modifications to the various interconnections of the execution units, data buses, bus controllers, and memory units can be made without departing from the spirit of the invention as expressed in the appended claims.

I claim:

1. A fully integral central processing unit for use in a computer system having an external memory and a clock generator, the central processing unit comprising:
   a clock means for receiving a clock signal from the clock generator;
   execution means, for performing operations on data in response to the clock signal the execution means generating a data needed signal when the execution means runs out of data;
   bus interface means, coupled to the external memory and the execution means, for receiving the data from the external memory, and providing the data to the execution means, the bus interface means generating a no data available signal when the bus interface means is unable to provide the data to the execution means; and
   clock disable means, coupled to the bus interface means, execution means, and clock means, for providing the clock signal from the clock means to the execution means and, disabling the clock signal in response to the no data available signal and the data needed signal.

2. The central processing unit of claim 1 wherein the clock disable means receives the clock signal, and gates the clock signal off in response to the no data available signal and the data needed signal.

3. The central processing unit of claim 2 wherein the clock disable means comprises a plurality of logic gates.

4. The central processing unit of claim 3 wherein the clock disable means further comprises a register.

5. The central processing unit of claim 2 wherein the clock disable means further comprises:
   a first logic gate including a first input coupled to the bus interface means to receive the no data available signal and a second input coupled to the execution means to receive the data needed signal, the first logic gate having a first logic gate output;
   a flip flop including a data input coupled to the first logic gate output, a clock input coupled to the clock means to receive the clock signal, and a flip flop output; and
   a second logic gate including a first gate input coupled to the flip flop output, a second gate input coupled to the clock signal, and a second logic gate output coupled to an execution clock input of the execution means, wherein the clock disable means idles the clock signal provided at the second logic gate output to the execution clock input when the data needed signal and the no data available signal are present.

6. The central processing unit of claim 5 wherein the first logic gate is an AND gate.

7. The central processing unit of claim 6 wherein the second logic gate is an OR gate.

8. The central processing unit of claim 1 wherein the clock signal is disabled when the no data available signal and the data needed signal are logic high.

9. The central processing unit of claim 1 wherein the clock disable means is responsive to the coexistence of the no data available signal and the data needed signal.

10. A computer system, comprising:
    a data source;
    a data bus coupled to the data source;
    an interface unit coupled to the data bus, the interface unit receiving data from the data source in response to a first clock signal, the interface unit providing a queue empty signal when the interface unit cannot receive the data from the data source;
    an execution unit coupled to said interface unit for receiving the data from the interface unit and performing functions on the data in response to a second clock signal, the execution unit providing a data request signal when the execution unit needs the data to continue performing functions;
    a clock circuit coupled to the interface unit and a clock inhibit circuit, the clock circuit providing the first clock signal to the interface unit and the second clock signal to the clock inhibit circuit; and
    where the clock inhibit circuit is coupled to the clock circuit, the execution unit and the interface unit, the clock inhibit circuit providing the second clock signal to the execution unit and stopping the second clock signal supplied to the execution unit in response to the queue empty signal and the data request signal.

11. The system of claim 10 further including a second data bus and wherein the execution unit receives the data from the interface unit over the second data bus.

12. The system of claim 10 wherein the execution unit provides the interface unit and the clock inhibit circuit with the data request signal.

13. The system of claim 12, wherein the interface unit provides the execution unit with the queue empty signal.

14. The system of claim 13, wherein the clock inhibit circuit gates the second clock signal off in response to the queue empty signal and the data request signal.

15. The system of claim 10, wherein the data source is an internal cache.

16. The system of claim 10, wherein the data source is an external memory.

17. A method of operating a computer system including a processor and a memory, the processor including a clock controller, a bus unit and an execution unit, the bus unit being coupled to the memory and the execution unit, the bus unit receiving data from the memory, the clock controller being coupled to the bus unit and the execution unit, the clock controller providing an execution clock signal to the execution unit, the method comprising the steps of:

transmitting the data from the bus unit to the execution unit;

performing operations in the execution unit on the data in response to the execution clock signal;

transmitting a queue empty signal to the clock controller circuit from the bus unit when the bus unit cannot provide the data to the execution unit;

transmitting a data required signal to the clock controller circuit from the execution unit when the execution unit is out of data; and idling the execution clock signal with the clock controller circuit so that the execution clock signal is not received by the execution unit in response to the queue empty signal and the data required signal.

18. The method of claim 17 wherein the bus unit transmits a data available signal and when the bus unit is able to transmit the data further comprising the step of:

providing the execution clock signal with the clock controller circuit when the bus unit transmits the data available signal.

19. The method of claim 18 wherein the data available signal is an inverted signal of the queue empty signal.

20. The method of claim 17 wherein the step of idling further includes gating the execution clock signal to a logic high.

21. A clock controller circuit for use in a computer system, the computer system including an execution unit for providing a data request signal when the execution unit needs data, and an interface circuit for providing a queue empty signal when the interface circuit does not have the data for the execution unit, the execution unit operating in response to an execution clock signal, the clock controller circuit comprising:

a first logic circuit coupled to the execution unit to receive the data request signal at a first input and coupled to the interface circuit to receive the queue empty signal at a second input, the first logic circuit having a first logic circuit output;

a register having a first register input coupled to the first logic circuit output, and a clock input for receiving a logic clock signal, the register having a register output; and a second logic circuit having a first logic input coupled to receive the clock signal and a second logic input coupled to the register output, the second logic circuit providing the execution clock signal at a second logic circuit output, the execution clock signal being disabled in response to the queue empty signal and data request signal.

22. The circuit of claim 21 wherein the first logic circuit is an AND gate.

23. The circuit of claim 21 wherein the second logic circuit is an OR gate.

24. The circuit of claim 23 wherein the register is a flip flop and the first logic circuit is an AND gate.

* * * * *